United States Patent [19]

Johnson

[11] Patent Number: 4,939,849

[45] Date of Patent: Jul. 10, 1990

[54] INFANT MEASURING DEVICE

[76] Inventor: Diana L. Johnson, 10 Cty. Hwy. #4, Wrenshall, Minn. 55797

[21] Appl. No.: 269,423

[22] Filed: Nov. 10, 1988

[51] Int. Cl.$^5$ .............................................. G01B 5/02
[52] U.S. Cl. ....................................... 33/811; 33/512; 33/3 A; 33/712
[58] Field of Search .................. 33/712, 783, 810, 811, 33/812, 806, 833, 700, 832, 784, 805, 3 R, 3 A, 512, 549

[56] References Cited

U.S. PATENT DOCUMENTS

| | | | |
|---|---|---|---|
| 226,429 | 4/1980 | Varnum | 33/810 X |
| 1,555,792 | 9/1925 | Souder | 33/810 |
| 1,594,255 | 7/1926 | Goldsmith | 33/3 A |
| 1,700,857 | 2/1929 | Schultz | 33/810 |
| 4,355,472 | 10/1982 | Wedge | 33/486 |
| 4,484,394 | 11/1984 | Hsia | 33/700 X |

OTHER PUBLICATIONS

Graham-Field, Inc., "Grafco Neo-Infantometer", (p. 22 of catalog).

Ellard Instrumentation Ltd., "O'Leary LengthBoards", (brochure).

*Primary Examiner*—Harry N. Haroian
*Attorney, Agent, or Firm*—Dorsey & Whitney

[57] ABSTRACT

A device for measuring infants has an elongated measuring base having at least one sequence of linear measuring indicia thereon extending from one end of the measuring base parallel to the axis of elongation. The base has a pair of opposed channels extending substantially the length of the measuring base parallel to the axis of elongation. A fixed end stop extends upward from the one end. A measuring stop is slidably connected between the pair of opposed channels of the measuring base. The measuring stop has a channel slide member with two opposed, parallel, channel-engaging edges that are biased to frictionally engage the interior of the opposed channels. Release means is operably connected to the channel slide member for counteracting the bias toward frictional engagement of the interior of said opposed channels. An index panel extends upward from the channel slide member and has an indicating relationship with the sequence of measuring indicia.

13 Claims, 2 Drawing Sheets

INFANT MEASURING DEVICE

TECHNICAL FIELD

The present invention relates to measuring devices. More particularly, the present invention relates to a portable measuring device for measuring infants.

BACKGROUND ART

Other than birth weight, infant size is probably the second most popular statistic for inclusion in birth announcements. Aside from this sentimental value, the length of an infant at birth and in succeeding months is often used to assess or monitor infant growth and health. As a result, accurate measurement of the length of an infant both at birth and during the early months of growth is an important function, affecting both clinical diagnosis and nutritional planning.

Having little or no idea of the significance of a length measurement, infants offer little cooperation in the measuring process. Frequently, measurements are taken by using a ribbon-type tape measure and extending it along the infant's body, which usually must be stretched out for an accurate measurement. Obviously, it is difficult to hold both the infant and the tape and to extend the infant's legs so that an accurate measurement can be made. To address this problem, at least two companies have introduced adjustable measuring devices for infant measurement. For one prior art device (Grafco Neo-Infantometer made by Graham-Field, Inc. of Hauppange, N.Y.) the adjustment is made with a slide rule-type construction, and a screw-type lock maintains the movable parts of the instrument at the desired length. The other prior art device (O'Leary Lengthboard made by Ellard Instrumentation Ltd. of Seattle, Wash.) has a flat base with a movable stop that has no locking capability. While these are more satisfactory than using a tape measure, the currently available models are still somewhat difficult to use, because of the need to manipulate both the measuring apparatus and hold the infant in position at the same time. Accordingly, there is a need for a simple, accurate measuring device that can be easily used to measure infants.

SUMMARY OF THE INVENTION

In accordance with the present invention, a device for measuring infants has an elongated measuring base with at least one set of linear measuring indicia thereon that extend from one end of the measuring base parallel to the axis of elongation. In addition, the measuring base has a pair of opposed channels extending substantially the length of the measuring base parallel to the axis of elongation. A fixed end stop extends upwardly from the one end. A measuring stop is slidably connected between the pair of opposed channels of the measuring base. The measuring stop comprises a channel slide member having two opposed, parallel, channel-engaging edges that are biased to frictionally engage the interior of the opposed channels. Handle means connected to the channel slide member are used when the channel slide member is moved, to counteract the bias towards frictional engagement of the interior of said opposed channels. An index panel extends upwardly from the channel slide member and has an indicating relationship with the measuring indicia on the base.

A primary objective of the present invention is to provide a device for accurately measuring the length of infants.

Another objective of the invention is to provide a lightweight, portable measuring device for measuring infants.

A further objective of the present invention is to provide a device for measuring infants that is simple to manufacture and has a minimum of parts.

These and other objectives of the present invention will become apparent with reference to the drawings, the description of the preferred embodiment and the appended claims.

DESCRIPTION OF THE PREFERRED EMBODIMENT

Figure 1:
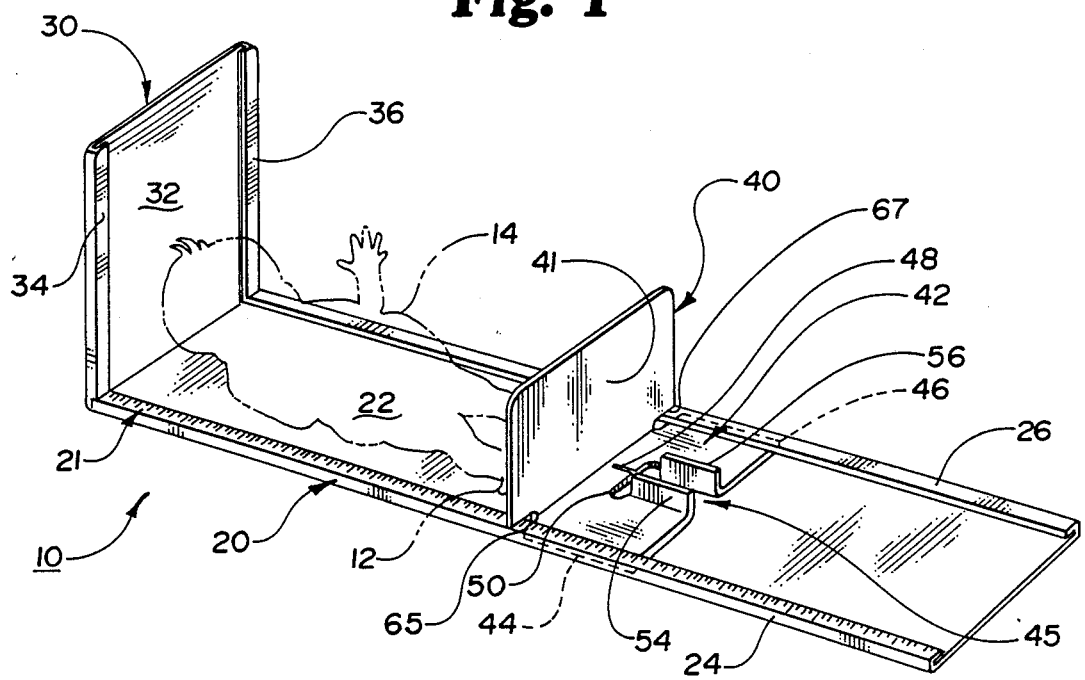
FIG. 1 is a pictorial view of the infant measuring device of the invention.

As best seen in FIG. 1, a measuring device 10 in accordance with the present invention has a generally rectangular measuring base 20 that is formed with a generally rectangular, flat central panel 22 having channels 24, 26 located along the edges of the central panel 22 that are parallel to its axis of elongation. The channels 24, 26 face each other with their open sides facing inward and opposing each other. In the preferred embodiment, the measuring base is about 36 inches long and eight inches wide. The channels 24, 26 are about $\frac{3}{8}$ inch wide, with a $\frac{1}{4}$ inch interior slot width. At least one measuring scale 21, consisting of a sequence of linear measuring indicia starts at the left end of the base 20 and extends along the upper, outside surface of one of the channels 24, 26 so as to be visible to one looking down on the base 20.

At the left end of the measuring base 20 where the measuring scale 21 starts (has its zero point) is a vertically extending fixed end stop 30. In the preferred embodiment the fixed end stop 30 is formed integrally with the measuring base 20 and of the same material. Accordingly, it also has a central panel 32 and channels 34, 36 along its edges. Its upper corners are rounded for safety.

Figure 4:
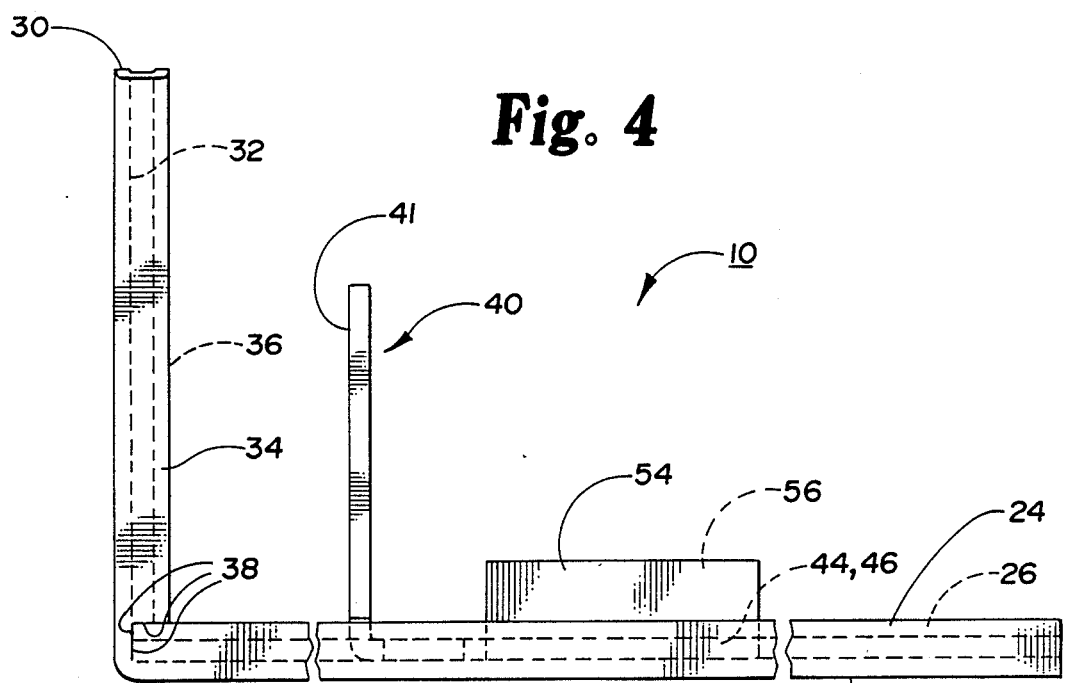
FIG. 4 is a foreshortened side view of the present invention.
Figure 5:
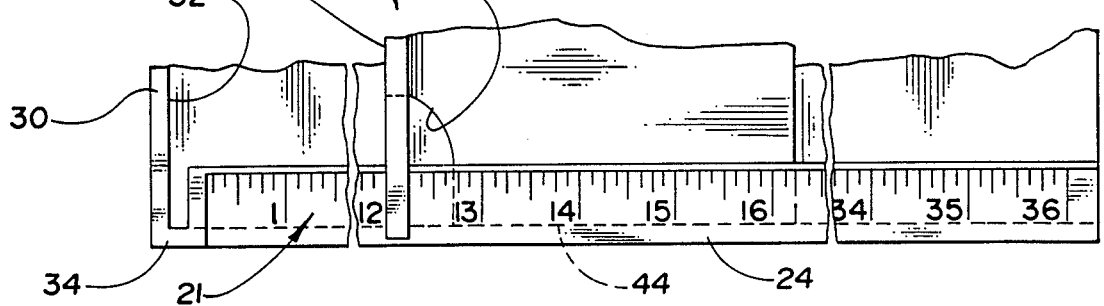
FIG. 5 is a cutaway top view of the invention as shown in FIG. 4, showing also the measuring indicia associated with the measuring base.

The base 20 and the end stop 30 are both preferably made from extruded, high-impact white polystyrene. The end stop 30 is raised at a ninety degree angle relative to the base 20 by a heating and bending operation. As can be seen in the detail view in FIG. 4, the connection between the base 20 and the end stop 30 is facilitated by removal of a notch 38 from each of the channels 34, 36 at the point of the bend.

A slidable measuring stop 40 provides the means for adjusting the measuring device 10 of the present invention. The measuring stop 40 has an index panel 41 that rises vertically above the base 20 and is joined at right angles to a channel slide member 42. (For safety the upper corners of index panel 41 are rounded.) The channel slide member 42 has parallel, opposed, channel-engaging edges 44, 46 that fit into the opposed channels 24, 26 of the base 20. In addition, the slide member 42 has a spring opening 45 lying between the channel engaging edges 44, 46. The shape of the spring opening 45 is generally rectangular with an elliptical extension 50 at the end nearest the index panel 41. In the center of the elliptical extension 50 is a relief notch 48. Handles 54 and 56 rise vertically on either side of the spring opening 45.

The measuring stop 40 is preferably integrally formed from a single sheet of high-impact white polystyrene, whose thickness is just slightly less than the width of the channels 24, 26. It is formed by cutting it to shape while flat, then heating and bending the index panel 41 and the two handles 54, 56 upward at right angles to the slide member 42. The handles 54, 56 permit a squeezing force to be applied at the spring opening 45 to move the channel engaging edges 44, 46 inward, away from the channels 24, 26. That is, the handles 54, 56 serve as release means to permit the parallel sides of the spring opening 45 to be forced slightly closer together, working against the resilience of the polystyrene.

Figure 2:
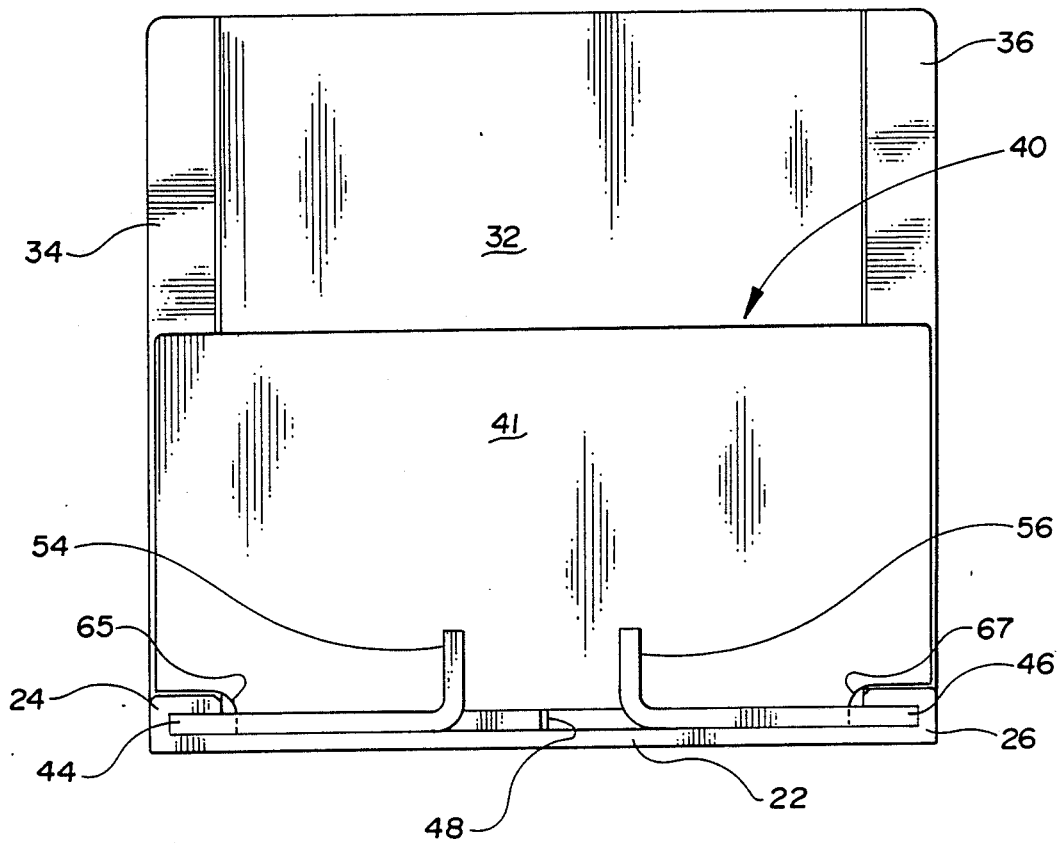
FIG. 2 is an end view of the device of the present invention.
Figure 3:
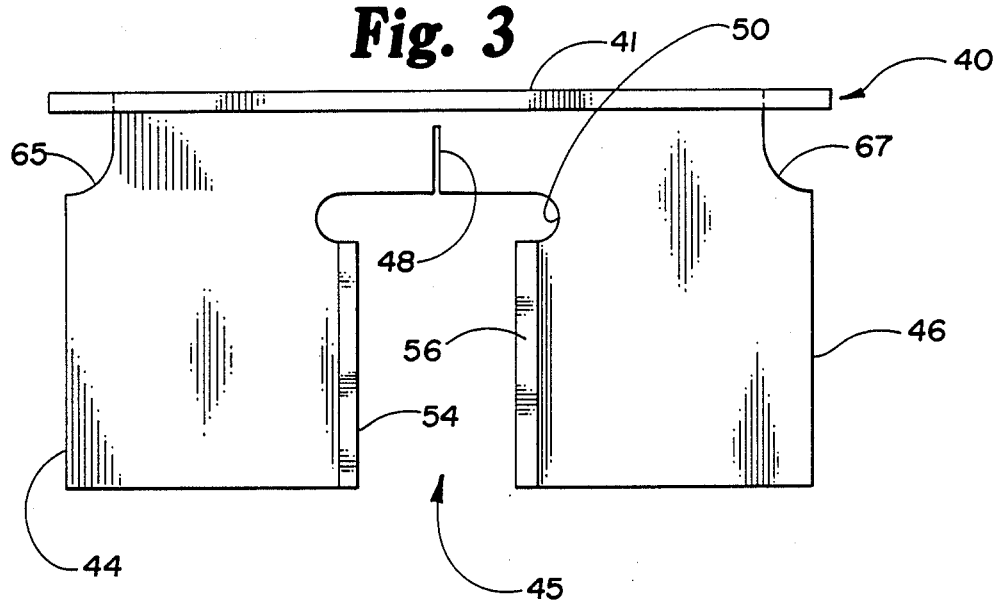
FIG. 3 is a top view of the measuring stop used as part of the present invention.

As best seen in FIG. 2, the channel engaging edges 44, 46 fit into the channels 24, 26 with the help of notches 65, 67 on either side of the lower edge of the index panel 41. In addition, as seen in FIG. 3, to help reduce friction during sliding caused by upward flexing of the channel engaging edges 44, 46 when handles 54, 56 are squeezed together, notches 65 and 67 also remove material from the corners of the slide member 42 adjacent the line where the index panel 41 and slide member 42 are joined.

In use, an infant is measured by placing the infant on its back on the measuring base 20 with its head placed against the fixed end stop 30. As the infant's legs are extended in the direction of the index panel 41 so that its full length can be measured, the person taking the measurement applies squeezing pressure to handles 54, 56 to release the frictional force of the channel engaging edges 44, 46 against the interior of channels 24, 26. This permits the measuring stop 40 to slide easily in either direction. To make the measurement, the measuring stop 40 is brought into contact with the extended legs 12 of the infant 14. Once the infant's extended legs 12 are in contact with the index panel 41, the handles 54, 56 can be released, because the frictional force of the channel engaging edges 44, 46 against the interior of channels 24, 26 will cause the measuring stop 40 to retain its position. In addition, the parallel channel engaging edges 44, 46, locate the index panel 41 at right angles to both channels 24, 26. The length of the infant can then be read accurately by observing the point at which the inner surface of the index panel 41 (i.e., the surface facing fixed end stop 32) meets a measuring scale on the top of one or both of the channels 24, 26. In the preferred embodiment, one channel is marked in inches, while the other is marked in centimeters, permitting both measurements to be readily observed.

The desired gripping action between the channel slide member 42 and the channels 24, 26 is provided by making the normal or unflexed width of the channel slide member 42 (measured between channel engaging edges 44, 46) just slightly greater than the distance between the opposed interior surfaces of the channels 24, 26. The spring opening 45, augmented by the relief notch 48 permits the slide member 42 to flex slightly when the handles 54, 56 are squeezed together. This flexing allows the channel slide member 42 to be inserted between the channels 24, 26 and after such insertion reduces the frictional force exerted by channel engaging edges 44, 46 against channels 24, 26. Upon release of the handles 54, 56, the resilience of the polystyrene material causes the channel engaging edges 44, 46 to spring back against the opposed inner surfaces of the channels 24, 26.

In addition to the ease with which the measuring stop 40 can be adjusted and fixed to make a measurement (usually, only one hand is required), the present invention offers other advantages. These include the relative rigidity of the elongated measuring base 20 resulting from the presence of channels 22, 24 integral with its edges. This permits it to be used on a hospital bed without undue bending. The relatively light weight of the device (about 3-4 pounds) permits it to be moved to the place where a child is resting. When made in short lengths, the measuring device 10 can easily be placed inside an incubator. The polystyrene material is more comfortable to touch than metal. It is also nonporous and easy to clean and keep sanitary, because the measuring stop 40 can be removed from the measuring base 20 by sliding it out the end opposite the fixed end stop 30.

What is claimed and desired to be protected by Letters Patent is:

1. A device for measuring infants comprising:
   an elongated measuring base having at least one sequence of linear measuring indicia thereon extending from one end of the measuring base parallel to the axis of elongation and further having a pair of opposed channels extending substantially the length of the measuring base parallel to the axis of elongation;
   a fixed end stop extending upward from said one end; and
   a measuring stop slidably connected between the pair of opposed channels of the measuring base, said measuring stop comprising:
   a channel slide member that is a flat member having two opposed, generally parallel, channel-engaging edges with a spring opening lying therebetween, the normal distance between said channel-engaging edges being slightly greater than the distance between the interior channel surfaces that it engages such that the channel-engaging edges are biased to frictionally engage the interior of said opposed channels;
   release means operably connected to said channel slide member for counteracting the bias toward frictional engagement of the interior of said opposed channels, said release means comprising a pair of opposed flanges, one connected on each side of said spring opening, such that when the flanges are squeezed together the width of the spring opening and the distance between the channel-engaging edges is reduced; and
   an index panel extending upward from said channel slide member and having an indicating relationship with said at least one sequence of measuring indicia.

2. The measuring device of claim 1 wherein said elongated base comprises a flat, elongated member with a pair of edges parallel to the axis of elongation and having a channel affixed to each edge, with the channels being parallel and open toward each other.

3. The measuring device of claim 2 wherein the fixed end stop is integrally formed with the elongated base.

4. The measuring device of claim 2 wherein the elongated base and fixed end stop are both formed from an extruded plastic member that is bent at ninety degrees to form the fixed end stop.

5. The measuring device of claim 1 wherein the measuring stop is integrally formed from a single sheet of material.

6. The measuring device of claim 1 wherein said spring opening comprises a generally rectangular opening cut into an edge of the channel slide member that lies perpendicular to said channel engaging edges.

7. The measuring device of claim 1 wherein said spring opening further comprises an elliptical opening at the edge of the rectangular opening that is opposite the edge into which the generally rectangular opening is cut.

8. A device for measuring infants comprising:
an elongated measuring base having at least one sequence of linear measuring indicia thereon extending from one end of the measuring base parallel to the axis of elongation and further having a pair of opposed channels extending substantially the length of the measuring base parallel to the axis of elongation;
a fixed end stop extending upward from said one end; and
measuring stop means for marking a point along said at least one sequence of measuring indicia, said measuring stop means being mounted for sliding movement along the axis of elongation and having means for frictional engagement of said channels and release means for counteracting said frictional engagement, said measuring stop means being a flat member having two generally parallel channel-engaging edges with a spring opening lying therebetween, the normal distance between said channel-engaging edges being slightly greater than the distance between the interior channel surfaces that it engages, and said release means comprises a pair of opposed flanges, one connected on each side of said spring opening, such that when the flanges are squeezed together, the width of the spring opening and the distance between the channel-engaging edges is reduced.

9. The measuring device of claim 8 wherein said measuring stop means has an index panel extending vertically relative to said base and having an indicating relationship with said at least one sequence of measuring indicia.

10. The measuring device of claim 8 wherein said elongated base comprises a flat, elongated member with a pair of edges parallel to the axis of elongation and having a channel affixed to each edge, with the channels being parallel and open toward each other.

11. The measuring device of claim 8 wherein the fixed end stop is integrally formed with the elongated base.

12. The measuring device of claim 8 wherein the elongated base and fixed end stop are both formed from an extruded plastic member that is bent at ninety degrees to form the fixed end stop.

13. The measuring device of claim 8 wherein the measuring stop means is integrally formed from a single sheet of material.

* * * * *